United States Patent [19]
Berg et al.

[11] Patent Number: 5,992,576
[45] Date of Patent: Nov. 30, 1999

[54] PARKING LOCK WITH SECONDARY BRAKE

[75] Inventors: Gerald M. Berg, Lisbon; Larry E. Albright, Gwinner, both of N. Dak.

[73] Assignee: Clark Equipment Company, Woodcliff Lake, N.J.

[21] Appl. No.: 08/876,406

[22] Filed: Jun. 16, 1997

[51] Int. Cl.⁶ .................................................. B62C 7/02
[52] U.S. Cl. .............................. 188/69; 180/273; 188/31
[58] Field of Search .................................. 188/265, 171, 188/173, 69, 74, 31, 60; 180/273, 272

[56] References Cited

U.S. PATENT DOCUMENTS

| | | |
|---|---|---|
| 2,180,677 | 11/1939 | Haller . |
| 2,728,420 | 12/1955 | Wright et al. . |
| 2,860,731 | 11/1958 | Hause ........................................ 188/69 |
| 2,875,856 | 3/1959 | Mrlik et al. ............................... 188/69 |
| 3,003,587 | 10/1961 | Garrett . |
| 3,300,001 | 1/1967 | Stockton . |
| 3,601,231 | 8/1971 | Kolacz ...................................... 188/69 |
| 3,653,473 | 4/1972 | Clay et al. ............................... 188/353 |
| 3,704,757 | 12/1972 | Buress, III . |
| 3,900,082 | 8/1975 | Sakamoto et al. ........................ 188/69 |
| 3,912,050 | 10/1975 | Iwanaga et al. . |
| 4,010,827 | 3/1977 | Ellis et al. . |
| 4,124,084 | 11/1978 | Albright et al. . |
| 4,252,219 | 2/1981 | Kauffman ................................. 188/69 |
| 4,355,819 | 10/1982 | Frisbee . |
| 4,378,061 | 3/1983 | Schierling et al. . |
| 4,480,708 | 11/1984 | Macht et al. . |
| 4,509,620 | 4/1985 | Verbos .................................... 188/171 |
| 4,673,054 | 6/1987 | Burke et al. . |
| 4,796,728 | 1/1989 | Kanengieter et al. . |
| 4,871,044 | 10/1989 | Strosser et al. . |
| 4,934,490 | 6/1990 | Chang . |
| 4,955,452 | 9/1990 | Simonz .................................... 180/271 |
| 4,962,821 | 10/1990 | Kim ........................................ 180/6.48 |
| 5,065,848 | 11/1991 | Barrett . |
| 5,109,945 | 5/1992 | Koga ....................................... 180/273 |
| 5,269,195 | 12/1993 | Kitagawara ............................. 74/411.5 |
| 5,322,146 | 6/1994 | Holl et al. ............................... 188/71.2 |
| 5,350,036 | 9/1994 | Shima ..................................... 180/273 |
| 5,365,804 | 11/1994 | Downs et al. ............................ 74/535 |
| 5,425,431 | 6/1995 | Brandt et al. ........................... 180/273 |
| 5,551,523 | 9/1996 | Berg et al. .............................. 188/273 |

FOREIGN PATENT DOCUMENTS

| | | | |
|---|---|---|---|
| 654218 | 12/1962 | Canada ..................................... | 188/69 |
| 0 393 629 A2 | 4/1990 | European Pat. Off. . | |
| 0 668 180 A1 | 2/1995 | European Pat. Off. . | |
| 2418280 | 4/1974 | Germany . | |
| WO 92/20547 | 11/1992 | WIPO . | |

*Primary Examiner*—Robert J. Oberleitner
*Assistant Examiner*—Melanie Talavera
*Attorney, Agent, or Firm*—Westman, Champlin & Kelly, P.A.

[57] ABSTRACT

A parking lock for a vehicle such as a skid steer loader is designed to provide a positive lock of drive elements when certain conditions are present on the loader, such as the absence of an operator on an operator seat or the movement of an operator restraint to its non restraining position. The lock member comprises a disc on a final drive axle, that has a member that engages lugs on the disc to provide the locking function, and a friction brake manually operable to engage the discs to reduce the speed of rotation of the discs. The discs having lugs thereon formed in relation to the forces urging lock member toward the discs, such that the lock member will ride on the outer periphery of the disc until the speed has been reduced to a selected amount generally by operation of the brake.

13 Claims, 9 Drawing Sheets

PARKING LOCK WITH SECONDARY BRAKE

BACKGROUND OF THE INVENTION

The present invention relates to a parking lock for a traction drive of a powered mobile machine such as a skid steer loader, incorporating a secondary operator actuated modulated brake to reduce the speed of the machine prior to the positive locking function.

U.S. Pat. No. 5,551,523 illustrates a traction drive lock which shows a device for the locking of drive components. The lock will engage substantially regardless of the machine speed.

In some instances is desirable to slow the machine before the traction lock drops into place.

SUMMARY OF THE INVENTION

The present invention relates to a combined positive lock which locks the drive train of a mobile machine, such as skid steer loader, combined with an operator actuated brake that acts directly on the same disc or discs as those used for the parking lock. The brake acts to slow the machine before the locking member drops into place. The lock is configured so that it will not engage until the machine has slowed sufficiently to lock the drive train without an excessive jolt.

The parking lock comprises a wedge that moves radially relative to at least one disc mounted on a final drive shaft. The disc of the present invention is modified to have radially extending lugs or teeth on its periphery that are sufficiently close together and shaped in relation to the loading of the wedge toward its locked position, so that the wedge will be deflected by the tips of the moving lugs and will not engage to stop the mobile machine until the machine has slowed to a desired speed.

The lock is made to engage in response to a sensed condition. For example, the lock will engage if there is a power failure, if the ignition key is turned off, if an operator restraint is raised, or from some other signal when the condition is sensed. The wedge moves toward the rotating disc, but will ride across the top of radial lugs on the disc if the disc is rotating above a desired speed. The wedge will not become sufficiently engaged with a lug to positively lock the drive until the machine has slowed and the rotational speed of the discs has been reduced. At the time when the wedge is released to engage the lugs, the wedge will ride against the outer ends of the lugs and bounce off or, in other words, will not enter the recess between the lugs sufficiently to lock if the machine is above a selected speed. The noise will alert the operator to apply the primary brake, the steering control levers, or the secondary manual brake that acts directly on the traction lock discs, as disclosed, to slow the machine with a modulated braking load. When the machine is slowed to a selected speed the wedge is permitted to drop into place between the lugs on the discs.

The combination brake and parking lock is effective for situations where the wedge lock is released to engage while the vehicle is traveling at relatively high speeds. Braking will avoid a sudden jolting stop. In this way, operator comfort is improved and there is less shock load on drive components.

The present apparatus also accommodates the situation when the lugs on the two discs are not perfectly synchronized as to rotational position of the discs. The wedge is capable of rocking about an axis perpendicular the axis of rotation of the discs so it rocks in a plane lying on the axis. The wedge can rock so that it can engage the lug on one disc and slide over a lug on the second disc until the next gap between lugs is aligned with the wedge, at which time the second drive disc would be stopped by the wedge.

DETAILED DESCRIPTION OF THE PREFERRED EMBODIMENTS

Figure 1:
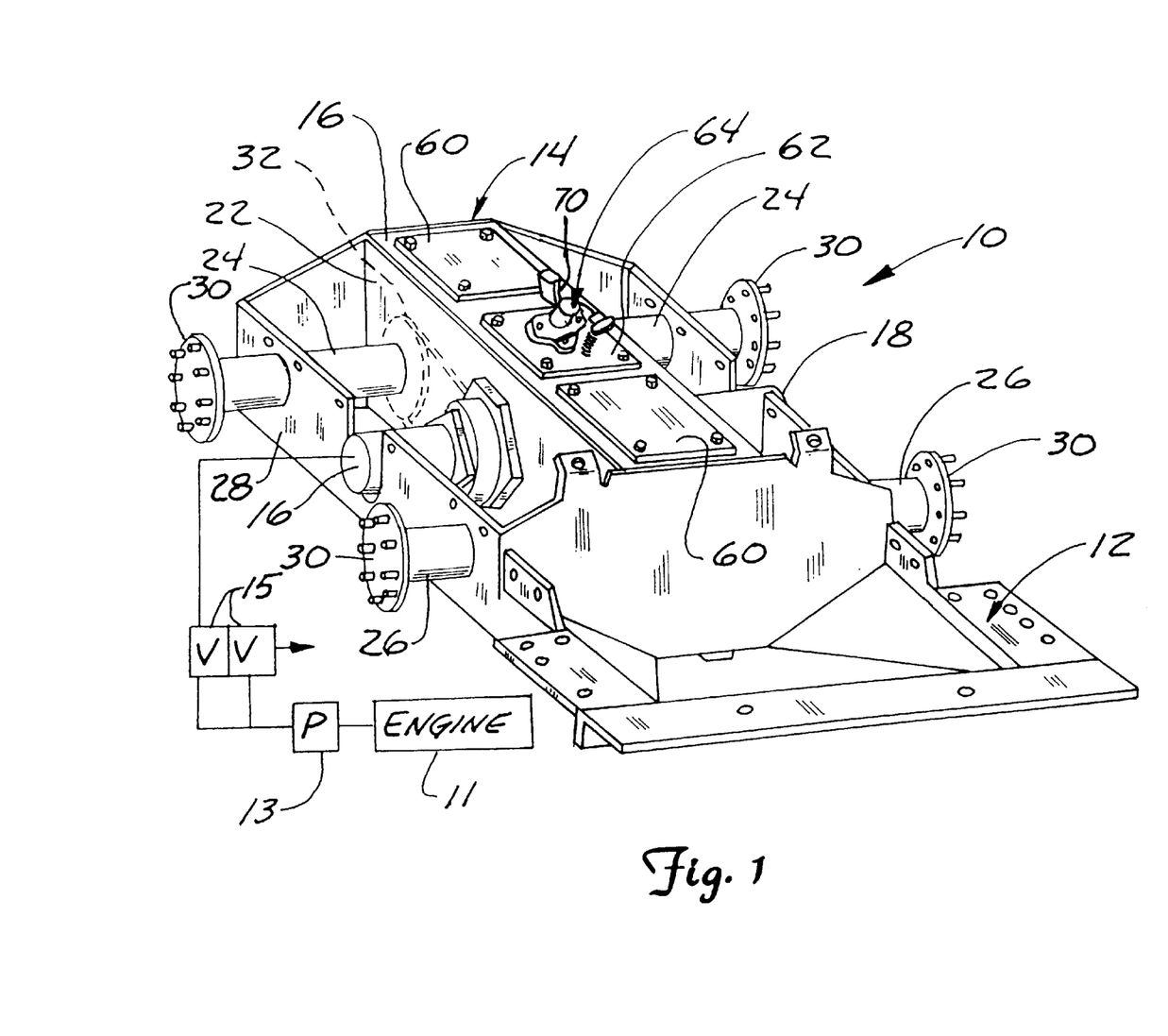
FIG. 1 is a rear perspective view of a main frame and drive train assembly of a mobile machine with which the parking lock of the present invention is utilized.

FIG. 1 is a representation of a lower frame assembly 10 of a skid steer loader, for purposes of explanation. An internal combustion engine shown schematically at 11 is actually mounted on a support 12 at the rear of the main transmission case 14, and drives a hydraulic pump 13 to supply hydraulic power through control valves 15 to hydraulic motors shown at 16 and 18 mounted on the opposite side walls 22 of the transmission case in a known manner. The valves 15 control power to the motors that are used to propel the vehicle and are operated by levers in an operator's compartment as shown in U.S. Pat. No. 4,955,455. The side walls 22 also are used for mounting front axle housings 24 and rear axle housings 26 to the transmission case. Suitable frame supports 28 are used for supporting the outer end portions of the axle housings. The axle housings mount internal axle shafts in a known manner, which drive wheel hubs 30. The axle shafts driving the wheel hubs are the final drive components. On a skid steer loader drive, the axles are driven by chain and sprocket drives and the two wheels on each side of the skid steer loader are driven by one of the motors 16 and 18, respectively.

Figure 2:
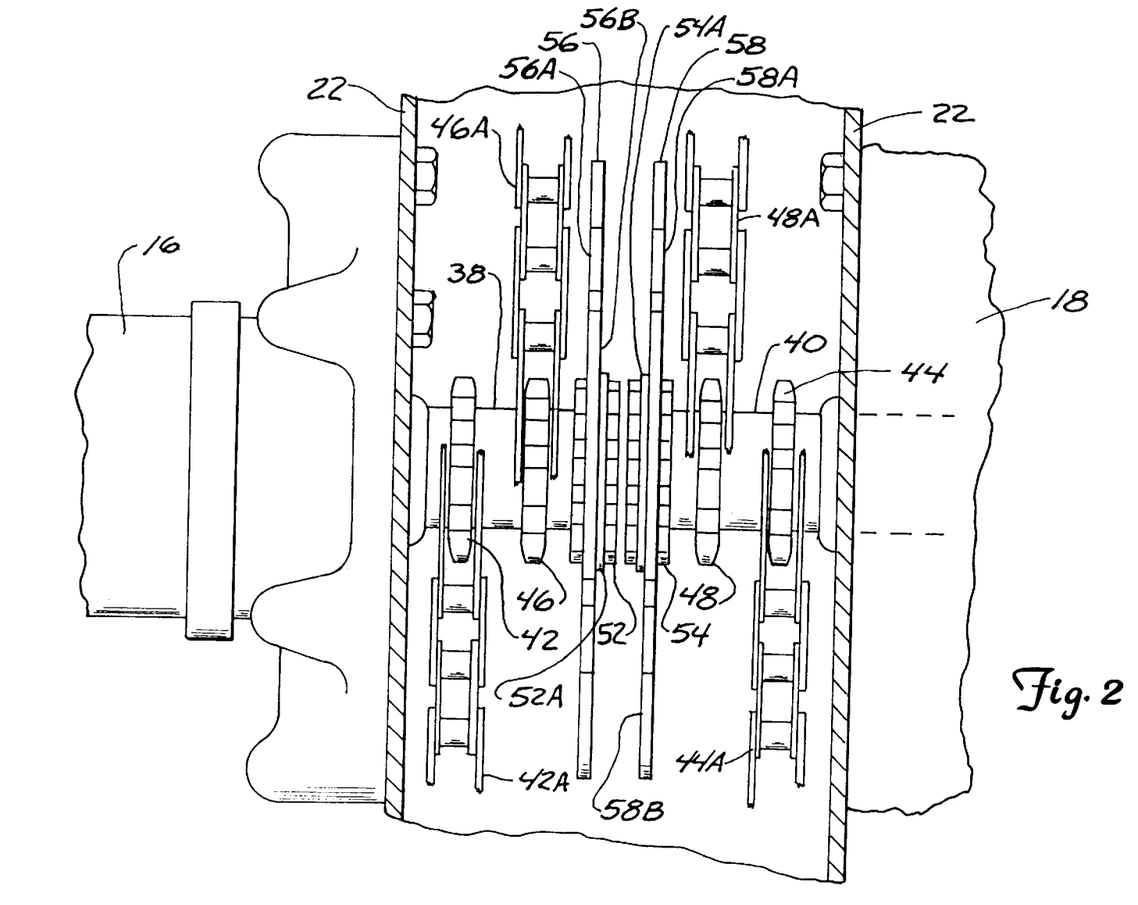
FIG. 2 is a sectional top view of the transmission of FIG. 1 showing final drive shafts.

In FIG. 1, a drive sprocket for the front left axle is indicated at 32 in dotted lines, and referring to FIG. 2, a cut away portion of the transmission is illustrated. The side walls 22, 22, as can be seen, mount hydraulic motors 16e and 18 respectively, and the motor shafts are drivably coupled to first and second sprocket assemblies 38 and 40 respectively.

The sprocket assemblies 38 and 40 are identically constructed but are on opposite sides of the transmission case.

The conventional drive sprockets 42 and 44 on opposite sides of the transmission case are drivably connected by chains to sprockets on the rear axles to drive the rear wheel hubs 30, the sprockets 46 and 48 are used for driving, through chains 46A and 48A, sprockets on the respective front axles to drive the front wheel hubs 30. In the present invention, the sprocket assemblies 38 and 40 further include wide sprockets 52 and 54 respectively, on the respective sides, each of which is formed as a unit with the respective drive sprocket assemblies 38 and 40. The sprockets 52 and 54 are elongated in axial direction and drivably support traction lock discs or first lock members indicated at 56 and 58, respectively.

Each of the hydraulic motors 16 and 18 is individually operated in a forward or rearward direction, so that the wheels on one side of the transmission case can be driven independently of the wheels on the other side. In other words, the sprocket assemblies 38 and 40 are independent and are spaced apart at the center of the transmission case.

Referring to FIG. 1, it can be seen that the top wall of the transmission case 14 has three covers including front and rear covers 60, and a center cover 62. The center cover 62 is used for mounting a solenoid assembly 64, which is part of the traction lock of the present invention, as well as a manual, foot operated brake pedal 70 for a secondary brake assembly used in connection with the traction discs 56 and 58. The solenoid assembly 64 includes a solenoid 67.

Figure 3:
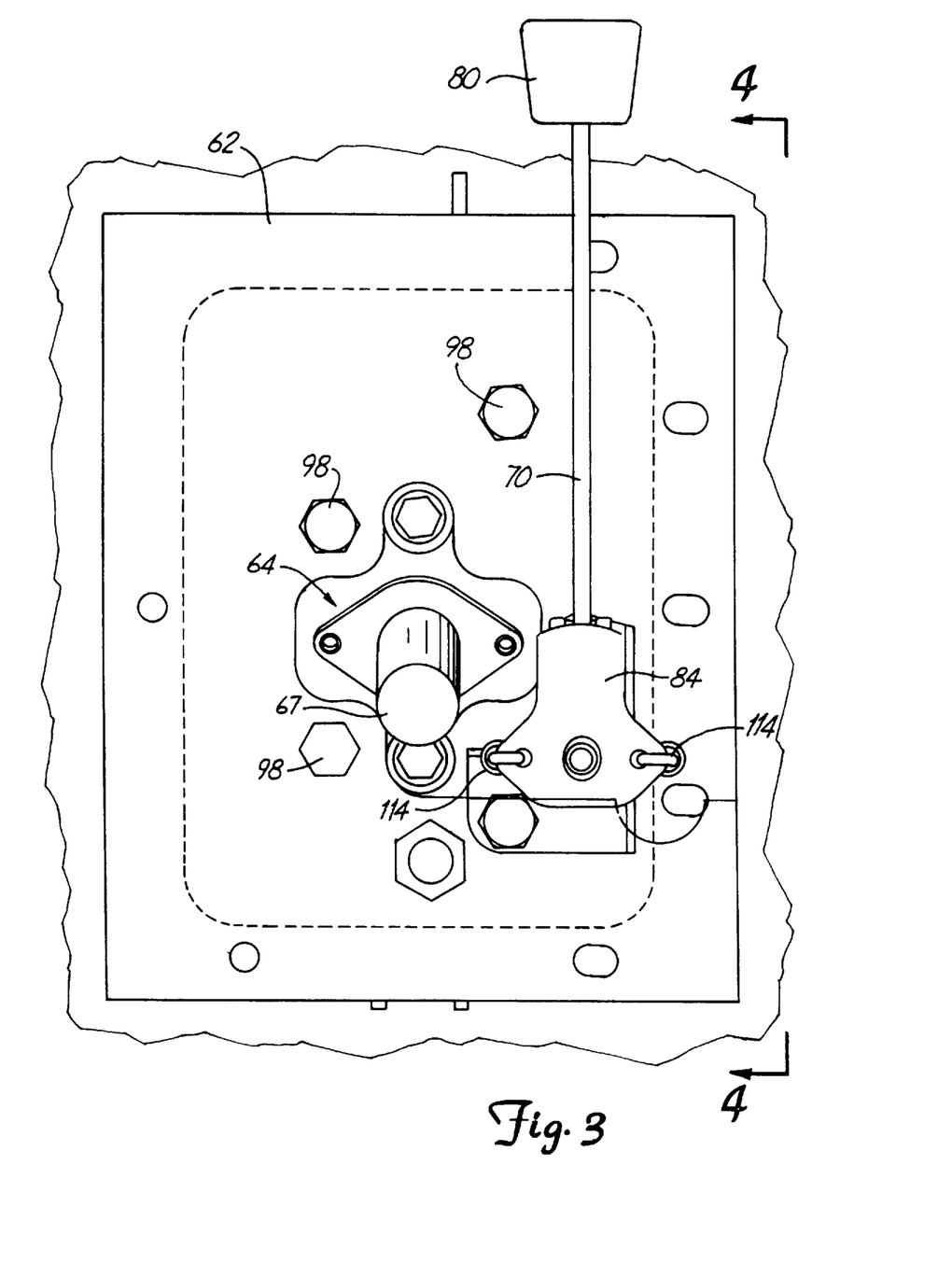
FIG. 3 is a top plan view of the transmission cover showing the brake of the present invention.

The transmission cover 62 is illustrated in top view in FIG. 3, and in addition to the brake 70 and the solenoid 67, it mounts a support 72 (FIG. 4) that is fixed to the transmission cover 62. The support 72 comprises a clevis or U-shaped support that is upwardly opening, and is used for pivotally mounting brake pedal 70 with a pivot pin 78. The brake pedal 70 has an operator's pad 80 that is positioned near the heel of an operator seated on the seat of a skid steer loader.

Figure 4:
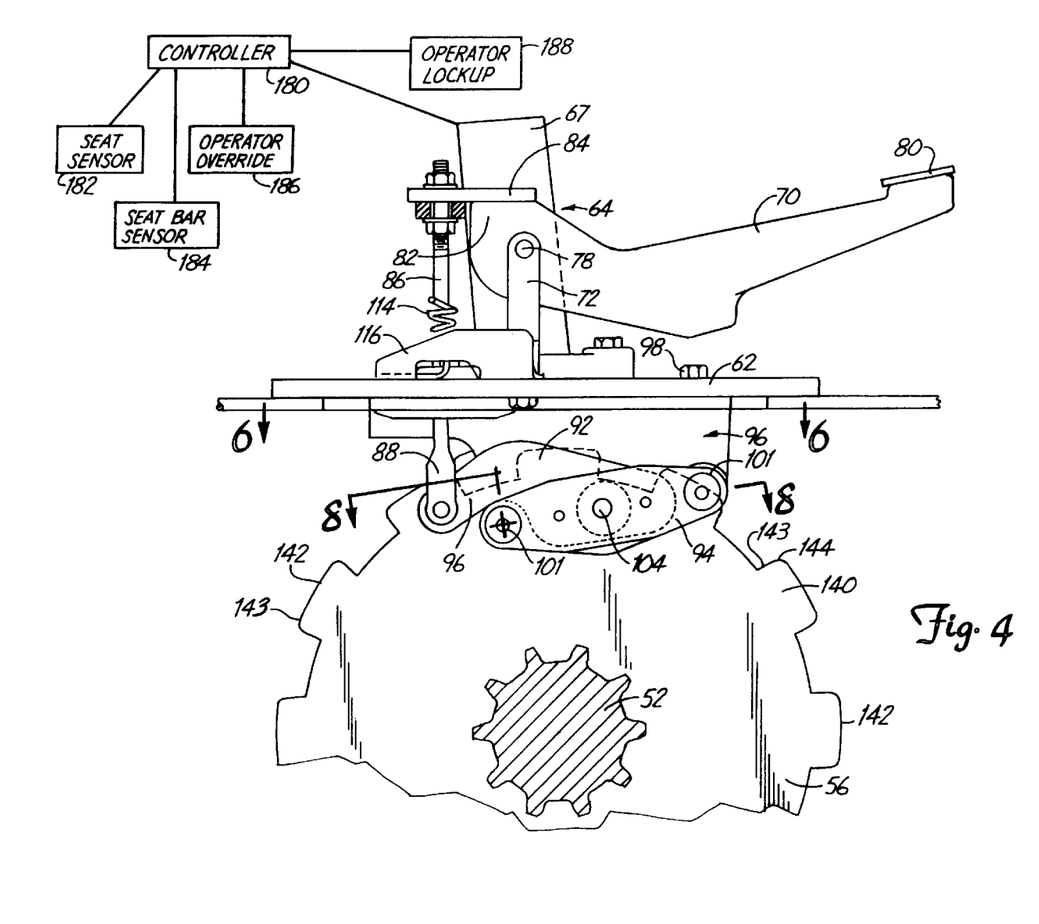
FIG. 4 is a side view of a parking secondary manually operated brake that operates on traction discs of the present invention.

The brake pedal 70 has a cam end 82 that operates against a cam follower plate 84, which in turn is connected to a pull rod 86 for a brake actuating clevis 88. The lower end of pull rod 86 and the clevis 88 are inside of the transmission case as shown in FIG. 4. The rod 86 is mounted through a provided opening in the cover 62, using a suitable flexible boot for a dust seal.

The clevis 88 as shown in FIG. 4 mounts onto an end of an arm 90 of a disc brake cam actuator 92 which is part of a cam type brake actuator assembly 93. A cam reaction plate 94 is fixedly mounted onto the side of a disc brake housing 96, that in turn is fixed with suitable bolts 98 to the transmission cover 62. The cam reaction plate 94 is spaced from the housing 96 on one side thereof, with suitable spacers 102, and held in place with countersunk screws 101. The disc brake cam actuator 92 is positioned in the space between the brake housing and reaction plate 94, as can be seen in FIGS. 6, 7, 8, and 9. The disc brake actuator 92 is mounted on a pivot pin 104 that in turn is supported on the cam reaction plate 94, so that when the link 96 is pulled by operating the brake 70, the disc brake cam actuator 92 will pivot relative to the cam reaction plate 94. The disc brake cam actuator 92 has a pair of cam lobes 110 hereon, which extend from a side surface facing cam reaction plate 94 and which may fit into cam sockets 112 on the cam reaction plate 94 when the brake is not actuated.

Figure 5:
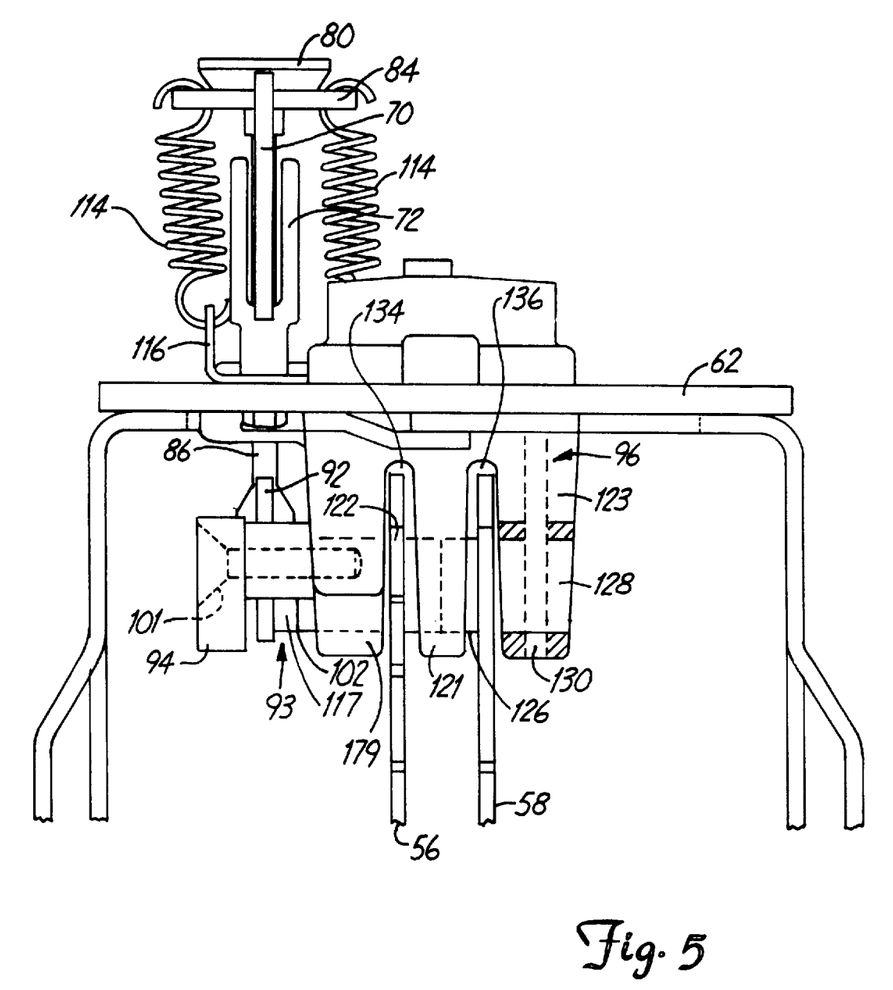
FIG. 5 is an end view of the device shown in FIG. 4.
Figure 6:
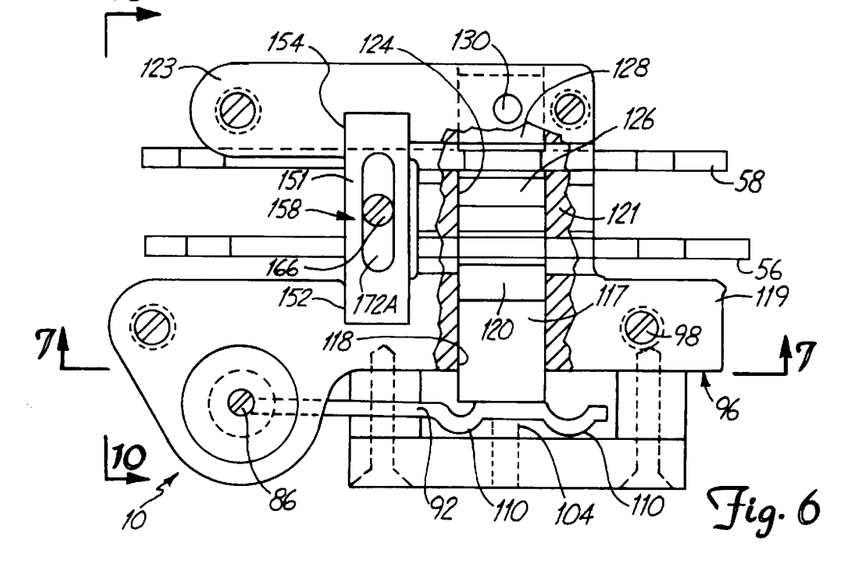
FIG. 6 is a fragmentary sectional view taken on line 6—6 in FIG. 4.
Figure 7:
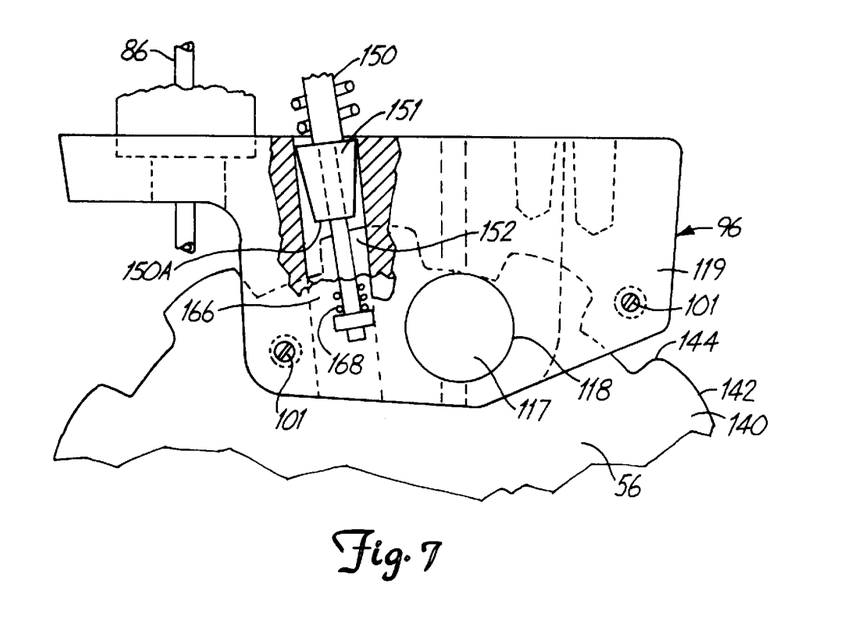
FIG. 7 is a side view taken along line 7—7 in FIG. 2 with parts broken away.
Figure 8:
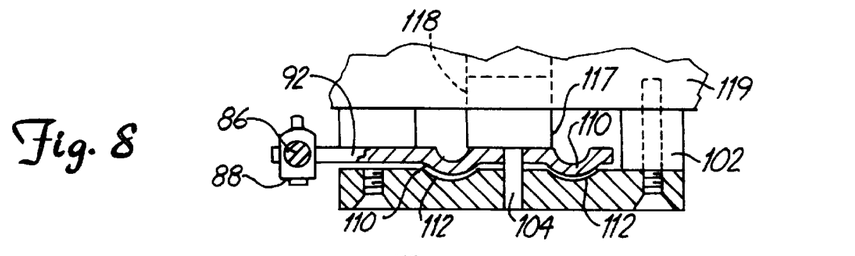
FIG. 8 is a sectional view taken as on line 5—5 in FIG. 4.

Referring to FIGS. 4 and 5, it can be seen that the rod 86 and clevis 88 are spring loaded to the brake disengaged position using a pair of springs 114 that are hooked onto a bracket 116 mounted on the cover 62, and onto the follower plate 84. This spring load is sufficient to return the brake cam actuator plate 92 to its unactuated position with the cam portions 110 seated in the receptacles 112 of the cam reaction plate, as seen in FIG. 8, when no pressure is being applied to the brake pedal and brake actuator.

Figure 9:
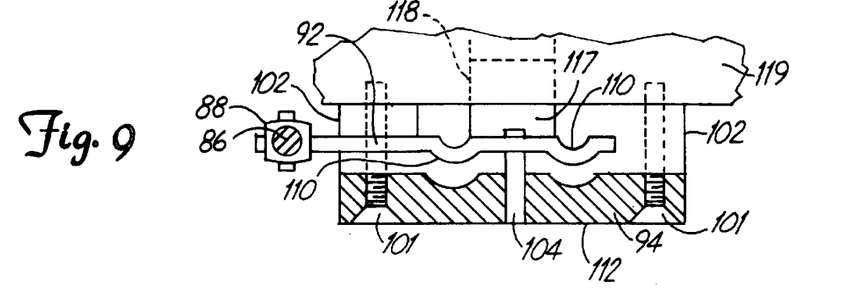
FIG. 9 is a sectional view taken substantially on the same line as FIG. 8 with the brake in an actuated position.
Figure 10:
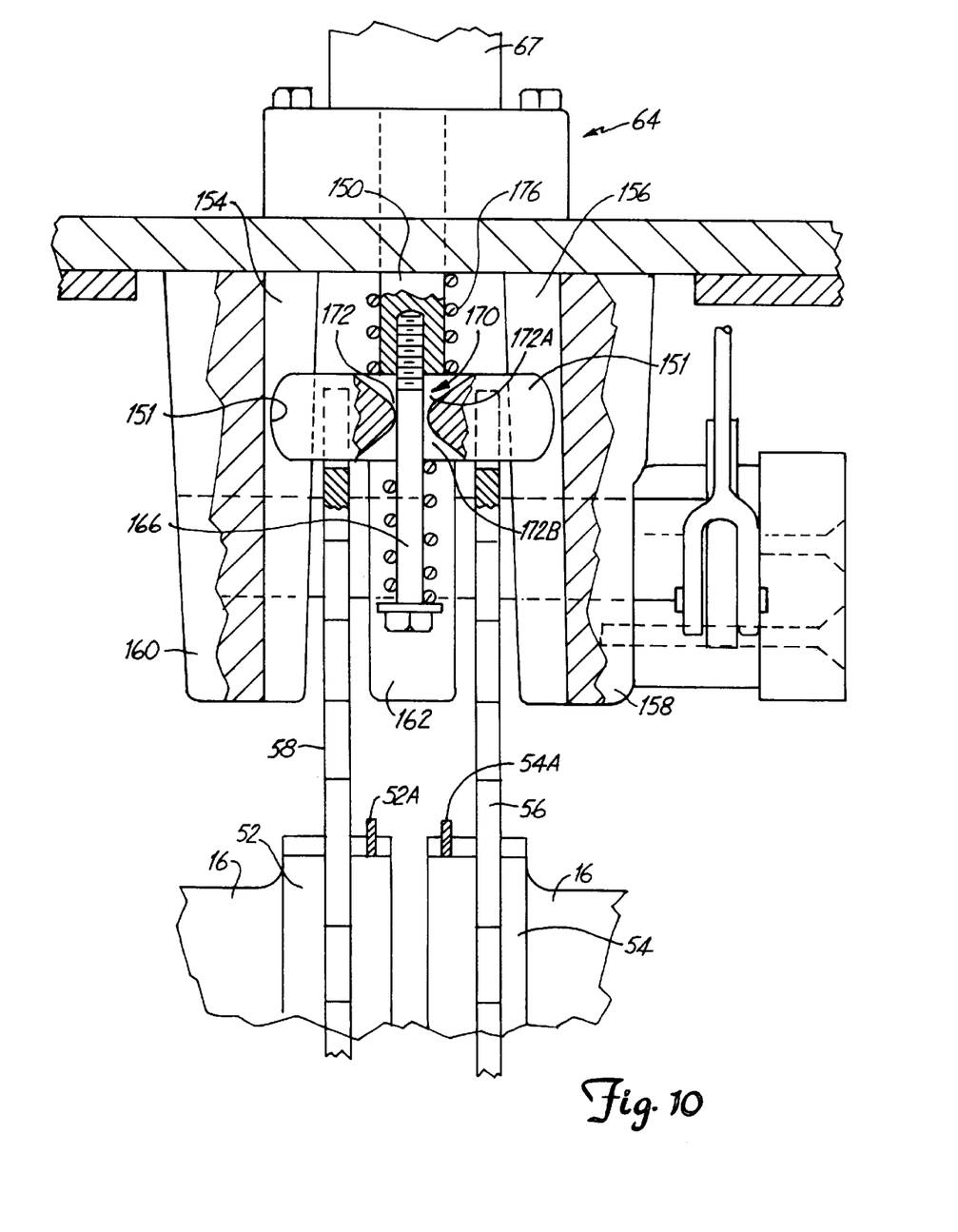
FIG. 10 is an enlarged view taken generally along lines 10—10 in FIG. 6.

When the brake pedal is depressed by placing force on the member 80, the pull rod 88 and the attached end of brake actuator 92 are moved upwardly about pivot pin 104, to cause the cam lobes of members 110 to be moved out of the receptacles 112 and slide against the cam reaction plate 94, as shown in FIG. 9. This movement provides an axial force on a cylindrical actuator or plug 117 that extends into a bore 118 of a depending lug 119 of the brake frame 96. A first brake pad 120, formed as a "puck", is also mounted in this bore 118 and extends out of the bore to be adjacent disc 56. The brake frame has a center depending lug 121 and a reaction lug 123 that are spaced apart to define slots 134 and 136 in which discs 56 and 58 are positioned and guided. The disc 56 is in slot 134 and the brake pad 120 will engage the side of disc 56 when the brake actuator 92 is actuated. The cam members 110 urge the pad 120 against disc 56, and disc 56 is moved toward a second brake pad 122 mounted in a bore 124 in the center lug 121 of the brake frame. A third brake pad 126 is mounted in the same bore 124 and extends out of the bore to bear against the disc 58, which is in slot 136. The disc 58 in turn is moved away from center lug 121 toward reaction lug 123 to engage a fourth brake pad 128 that is held in a bore in reaction lug 123 with a suitable stop pin 130.

The receptacles or grooves 134 and 136 in the brake frame for receiving the discs 56 and 58, provide guides for the discs 56 and 58 as they are driven from the final drive shafts.

When the brake pedal 70 is actuated, the brake pads 120, 122, 126 and 128 provide a friction braking force against the side surfaces of the park lock discs 56 and 58, to reduce the speed of the mobile machine that is being driven.

Figure 12:
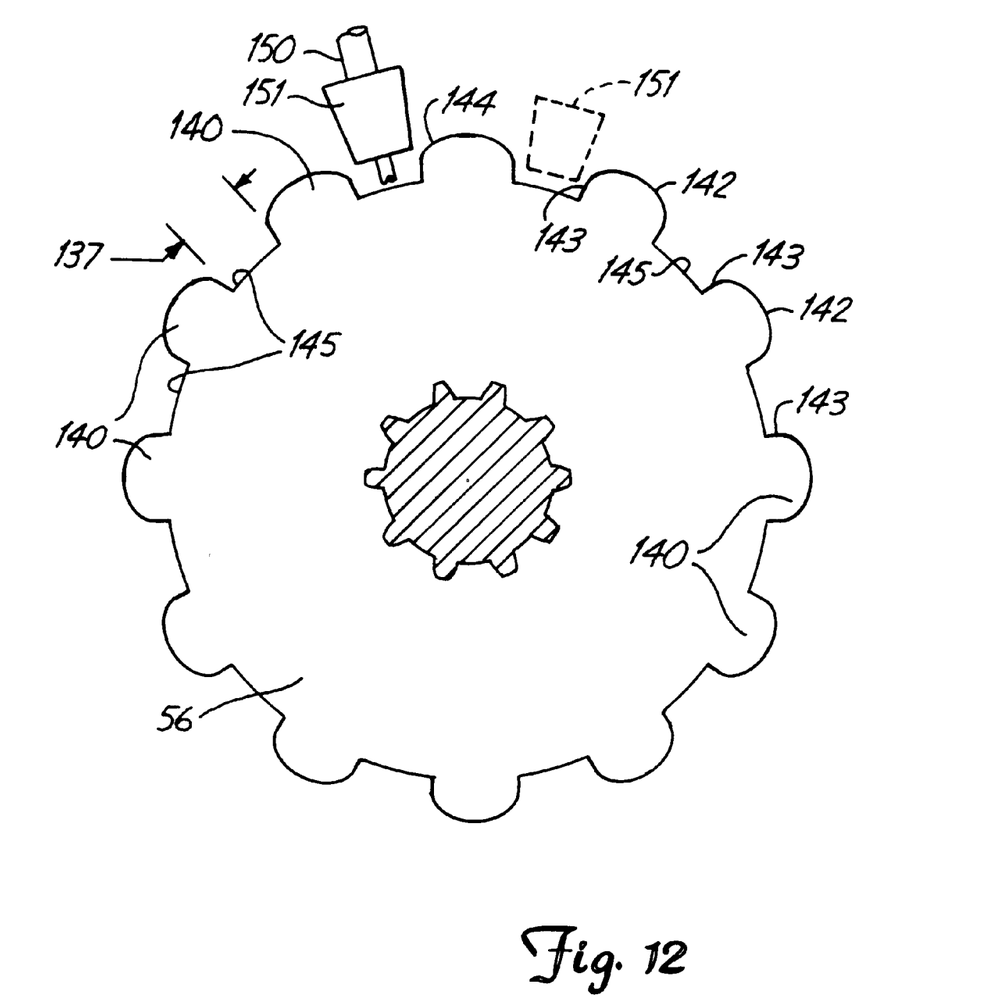
FIG. 12 is a view showing the disc of the present invention with a wedge partially engaging the lugs, to show the amount of penetration into the gap between the lugs when the mobile machine is traveling greater than a selected speed.

The discs 56 and 58, as shown in FIG. 12 in particular, are formed with a plurality of peripheral radially extending lugs that are relatively closely spaced around the periphery of the discs. In the present form the discs have twelve lugs 140, which provides a narrow gap 137 between adjacent lugs on the periphery of the disc. The lugs 140 extend out from edge surfaces 145. As shown each of the lugs 140 has a tapered outer edge in the form of a crown or rounded tip 142. The tapered corner is shown at 144, and it is such that the corner surface leads up to the maximum crown section in the center of the rounded portion 142. The tapered corners extend from radially extending stop edges 143 on the leading edges of the lugs, used for locking the discs for parking. The taper leads from the "break" or first deviation in the radial edge, where the taper starts, to the maximum diameter of the lug.

The solenoid 67 which was previously mentioned as part of the solenoid assembly 64, has its central axis inclined rearwardly slightly from the vertical, as shown. The park lock assembly can utilize a solenoid that has two actuator coils for two levels of force if desired. The solenoid assembly 64 has a plunger 150 that carries a wedge locking 151 forming a second lock member. The plunger is actuated by solenoid 67. The locking wedge or second lock member 151 is guided in suitable slots or tracks 152 and 154 formed on the inner surfaces of the end depending lugs 119 and 123 of the brake frame assembly 96. The end lugs 119 and 123 also form depending housings which contain the bores for brake pads. The center lug 121 has a bore for the brake pads, but is trimmed away in the region 158 shown in FIG. 6, where the locking wedge 151 travels. The locking wedge spans the space between lugs 119 and 123.

The plunger 150 supports the locking wedge 151 below the cover plate 62 and thus is within the transmission case just above the discs 56 and 58, respectively. Discs 56 and 58, as disclosed, are drivably connected to the final drive from power units comprising the hydraulic motors 16 and 18.

The locking wedge 151 is moved and actuated by the solenoid plunger 150 and is held on the end of the plunger using a bolt or threaded rod 166. The bolt 166 threads into the bottom of the plunger 150 and is a lock bolt that locks in place in the plunger. A spring 168 is positioned between the head of the bolt 166 and the underside of wedge 151 to spring load the wedge 151 against the bottom of the plunger 150. The wedge 150 is elongated in a transverse direction, and is tapered in cross section so that it is generally trapezoidal in shape with a narrower edge 150A on the lower side (see FIG. 7).

The lock wedge 151 also has rounded ends shown at 151B for permitting it to slide easily in the guide slots 152 and 154. The guide slots 152 and 154 can be hardened to insure there will be little wear and that the wedge will slide easily toward and away from the discs 56 and 58.

Figure 11:
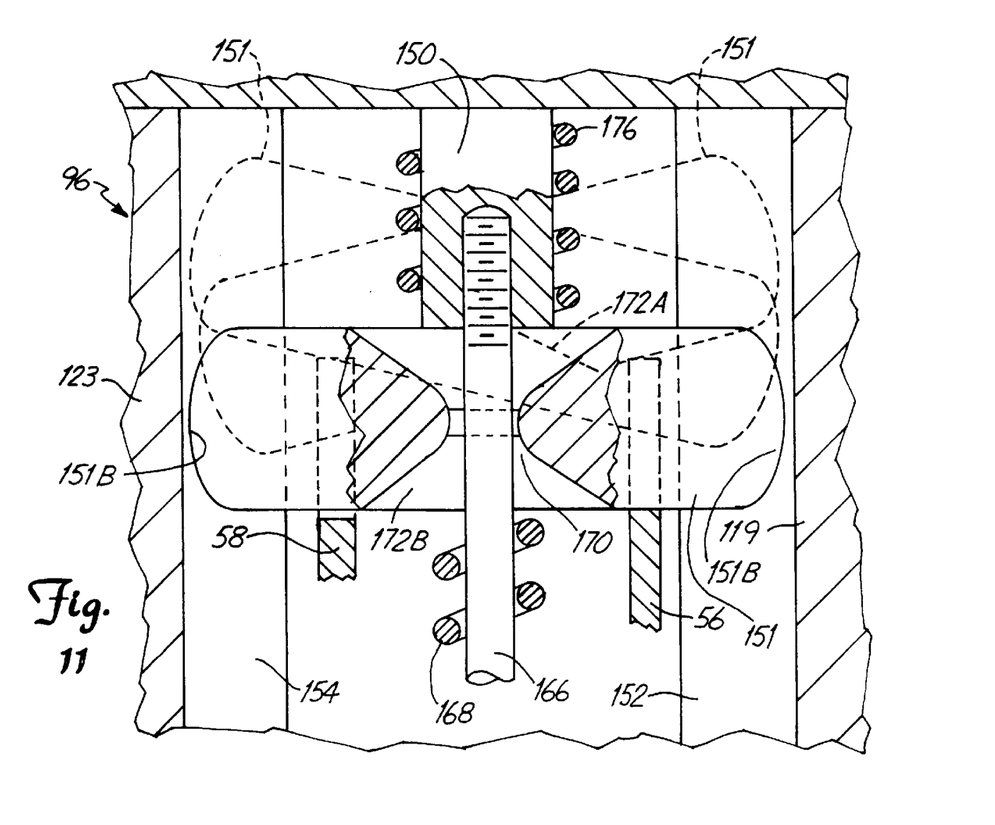
FIG. 11 is an enlarged sectional view of a locking wedge mounted on an actuator rod.

The bore 170 in the locking wedge 151 receiving bolt 166 is made specifically for accommodating tilting of the locking wedge 151 as it moves in the guide slots 154 and 156. As can he seen in FIG. 11, the bore 170 in wedge 151 has a short bore portion 172 which is of slighter larger size than the bolt 166, but can be configured to permit tilting. The opposite ends of the bore 170 are widened out in lateral directions so that there is a shallow "V" shape in each direction from bore portion 172 as shown at 172A and 172B. This permits the wedge 151 to cock or tilt on the bolt 166 sufficiently so that it can be engaged at least partially on the lugs toward an edge surface 145 between adjacent lugs 140 on one of the discs 56 or 58, and the opposite end of the wedge 151 can cock so it rides up over the ends 142 of lugs 140 of the other disc. This is to accommodate the situation where the lugs on the discs 56 and 58 may not be axially aligned when the solenoid 67 is de-energized and the wedge lock member 151 moves to a park-lock position.

A spring 176 is provided around the plunger 150, and is positioned between the upper side of the lock wedge 151 and the cover 62 to urge the wedge 151 downwardly under a spring force that is less than the spring force from the spring 168. Thus, whenever the solenoid 67 or other actuator is not energized the lock member or wedge 151 is urged linearly toward the discs 56 and 58.

The bore portions 172A and 172B are flared to permit the wedge 151, as explained, to cock so that the wedge can enter one of the sets of lugs on one of the discs while riding over a lug on the other disc until a recess aligns with the wedge.

The ends of the lugs on the discs are rounded or beveled sufficiently so that the wedge has to penetrate inwardly into the lugs 140 a distance before the wedge will fully engage the radiated surface of the lugs. The wedge 151 will ride over the ends of the lugs 140 when the discs 56 and 58 are rotating at a speed such that the wedge does not have sufficient time to drop into place before the next lug hits it. In this way, the speed of the machine is a factor in whether or not the wedge will engage the lugs to stop the machine. If the machine is going too fast, the wedge will ride across the tops of the lugs on the discs and will not engage a lug to stop the drive until the machine ground speed has dropped a sufficient amount so that the wedge can enter into the recess between the lugs, 140 and engage the leading stop edge of one of the lugs 140 to positively lock the machine drive train. The wedge 151 riding on the ends of the lugs 140 creates a clatter that alerts the operator of the machine that the modulated brake acting on the discs should be applied.

The solenoid 67 for the lock wedge 151 can be connected into a control circuit that is shown schematically in FIG. 4. A controller 180 is provided to supply power to the solenoid. The solenoid 67, or other actuator, is energized in response to one or more input signals so that there can be, for example, two conditions that have to be fulfilled before the solenoid 67 will be energized to release the park lock or traction lock for machine operation. A seat sensor 182 is one such sensor providing a signal to the controller, and a seat bar or operator restraint sensor 184 also can be provided. Signals are provided to the controller, and the if operator is sitting in the seat and the seat bar or operator restraint is in its operative position where it will restrain the operator, then the controller will energize the solenoid 67 to permit the park lock to be released. The solenoid 67 will retract the plunger 150 and if the wedge is engaging the lugs on the discs 56 and 58 under load, the spring 168 will compress as the plunger and bolt 166 are retracted, but the lock wedge 151 will stay locked until load is released slightly. If the signal from either the seat sensor or the seat bar sensor indicates that the operator is off the seat, or if the seat bar is not in its operative position, the solenoid 67 will be de-energized and the lock wedge (and bolt 166) will be urged toward the lugs 140 on the discs 56 and 58 under the spring load from the spring 176. Again, when the operator is not in the seat or the seat bar is in its operative position, the coils in the solenoid 67 will be de-energized so the wedge will drop toward the discs 56 and 58.

If desired, an operator override switch 186 may be provided to energize the solenoid and disable the lock system even through the operator may not be in the seat or the seat bar may not be in its operative position. If for example the operator is to run a backhoe utilizing the hydraulic system of the skid steer loader, and needs to move the skid steer loader, the park lock needs to be released even though the operator is not in the seat. The operator override switch is either on the dash or the control panel, or someplace within the operator's compartment, and is preferably a push on/off switch so that once "on" the traction lock solenoid will remain energized to release the lock wedge and permit machine movement until the operator again pushes the override switch.

A further function for manual operation is a manual lock-up switch shown at 188, which will permit an operator to lock the traction drive through the controller and cause the traction drive to remain locked, regardless of other conditions (except the override switch 110) so that the machine cannot be moved.

The operator has the option of leaving the locking wedge 151 in its locking position, for example, for a parked position until the operator again operates the lock-up control switch or operates the override switch.

Although the present invention has been described with reference to preferred embodiments, workers skilled in the art will recognize that changes may be made in form and detail without departing from the spirit and scope of the invention.

What is claimed is:

1. A parking lock for locking a final drive of a machine in combination with the machine comprising:

a frame;

a rotary drive mounted on the frame for driving at least one axle of a machine, the rotary drive including a rotating final drive component rotatably mounted on the frame;

a disc mounted on the final drive component and rotating therewith, said disc having an outer periphery;

a plurality of lugs formed on an outer periphery of the disc and being closely spaced around the outer periphery, outer ends of said lugs having a taper that extends from a rotationally leading edge to a center portion of outer ends of the lugs such that the center portion of the lug is of greater radius than the leading edge;

a lock member slidably movable linearly and substantially radially in directions toward and away from the disc from a first position wherein the lock member clears the lugs on the disc, to a second position where it intercepts a lug in the path of rotary movement of the lug;

a first spring urging the lock member toward its second position;

a power actuator operable to exert a force on the lock member to move the lock member away from the periphery of the disc, including a plunger, the first spring urging the plunger slidably mounted relative to the lock member, and the lock member toward the periphery of the disc;

a second spring transferring load from the plunger to the lock member when the power operator is energized, the second spring loading the lock member to permit the power actuator to actuate the plunger while the lock member remains in the second position where it intercepts a lug and is held by loads exerted thereon by the intercepted lug; and a brake actuable by an operator of the machine to engage a surface of the disc and exert a frictional force tending to slow rotation of the disc, said lugs on said disc being spaced such that the lock member will ride on the outer ends of the lugs until the speed of rotation of the disc is below a selected speed and the lock member moving to intercept a lug.

2. The parking lock of claim 1, wherein said brake is a disc brake operating against a side surface of the disc.

3. The parking lock of claim 1, wherein said brake comprises a brake housing, said brake housing having depending portions that are positioned on opposite sides of said disc, said depending portion having bores therein for mounting disc friction brake pads, one of said depending portions comprising a reaction member preventing movement of a brake pad in a first direction more than a selected amount, a second of said depending portions mounting a brake pad that is slidably mounted to be moved in the first direction under manual force to cause the disc to be held between the brake pads.

4. The parking lock of claim 1, wherein said plurality of at least 12 lugs are evenly spaced around the periphery of the disc.

5. The parking lock of claim 1, wherein the power actuator comprises a solenoid having the plunger, actuated when the solenoid is powered to tend to move the lock member through the second spring.

6. A device for positively locking the drive of a mobile machine having a pair of final drive axles with a pair of discs mounted one on each said axles and capable of sliding axially relative to the axles;

a plurality of lugs formed on the edges of each of said discs;

a lock member aligned to move toward and away from a power actuator for moving the lock member away from the discs under power, a spring for urging the lock member toward the lugs to a lock position when the power actuator is not powered;

said lock member spanning both of said discs to engage lugs on both of said discs simultaneously when in a lock position;

a brake assembly having a brake frame, at least three depending housing portions on said brake frame, said housing portions being spaced to define passageways in which said discs rotate, first and second housing portions having bores therein for receiving first brake pads movable in one direction toward a reaction brake pad secured relative to a third outer housing portion; and a manual actuator on a side of said brake frame opposite from said third housing portion and being operable to exert a force tending to move the first and second brake pads sequentially against the discs and the discs and first and second brake pads toward the reaction brake pad to apply a friction load tending to slow rotation of the discs.

7. The apparatus of claim 6, wherein said lock member is slidably mounted on a rod connected to the actuator, said rod providing a force under spring load tending to urge the lock member away from the lugs on the disc when the power actuator is under power, and said lock member having an aperture for receiving said rod, the aperture flaring outwardly in a transverse direction such that the lock member can cock laterally and clear the lugs on one of the discs while engaging the lug on the other disc.

8. The apparatus of claim 6, wherein said brake frame has outer side portions providing a span between them at least on a portion of said brake frame, and said lock member being positioned between said outer side portions and slidably guided on the side portions as the lock member moves toward and away from the discs.

9. The apparatus of claim 8, wherein said lugs on the disc are positioned at a spacing around the periphery around the disc and a crown is formed on the lugs such that under a spring load urging the lock member toward the lugs when the power member is not under power, the lock member will ride against the outer crowned edges of the lugs until the speed of rotation of the discs has reduced to a selected speed.

10. A parking lock for locking a final drive of a machine in combination with the machine comprising:

a rotary drive mounted on a machine frame including a rotating final drive component;

a positive lock comprising a first lock member rotatably driven by the final drive component;

a second lock member mounted on the frame and movable toward and away from the first lock member from a first position wherein the first and second lock members are disengaged to a second position where the first and second lock members engage to prevent rotary movement of the final drive component;

a bias force urging the second lock member toward its second position when the second lock member is released from a retaining force; and a brake operated by an operator of the machine for slowing rotation of the final drive component, the first and second lock members having rounded facing surfaces which contact when the second lock member is released from a retaining force, but which do not engage until the speed of the rotating final drive component is below a selected speed.

11. The parking lock of claim 1, and an operator actuated foot pedal for moving the brake to a brake actuated position.

12. A parking lock for locking a final drive of a machine in combination with the machine comprising:

a frame;

a rotary drive mounted on the frame for driving at least one axle of a machine, the rotary drive including a rotating final drive component rotatably mounted on the frame;

a disc mounted on the final drive component and rotating therewith, said disc having an outer periphery;

a plurality of lugs formed on the outer periphery of the disc and being closely spaced around the outer periphery, outer ends of said lugs having a taper that extends from a rotationally leading edge to a center portion of outer ends of the lugs such that the center portion of the lug is of greater radius than the leading edge;

a lock member slidably movable linearly and substantially radially in directions toward and away from the disc from a first position wherein the lock member clears the lugs on the disc, to a second position where it intercepts a lug in the path of rotary movement of the lug under a spring urging;

a spring urging the lock member toward its second position;

a brake actuable by an operator of the machine to engage a surface of the disc and exert a frictional force tending to slow rotation of the disc, said lugs on said disc element being spaced such that the lock member will ride on the outer ends of the lug until the speed of rotation of the disc is below a selected speed; and said brake comprising a brake housing, said brake housing having depending portions that are positioned on opposite sides of said disc, said depending portions having bores therein for mounting disc friction brake pads, one of said depending portions comprising a reaction member preventing movement of a first brake pad on the reaction member in the first direction more than a selected amount, a second of said depending portions mounting a second brake pad that is slideably mounted to be moved in the first direction under force when the brake is actuated by an operator to cause the disc to be held between the brake pads.

13. The parking lock of claim 10, wherein said second lock member is operated by a power actuator.

* * * * *